US010990875B2

United States Patent
Panda et al.

(10) Patent No.: US 10,990,875 B2
(45) Date of Patent: Apr. 27, 2021

(54) NEURAL NETWORK FORECASTING FOR TIERED HYDROPONIC NATURAL FARMING CONFIGURATIONS

(71) Applicant: INTERNATIONAL BUSINESS MACHINES CORPORATION, Armonk, NY (US)

(72) Inventors: Ashok K. Panda, Banaglore (IN); Aaron K. Baughman, Silver Spring, MD (US); Ashish Tanuku, Lucas, TX (US); Remi Pierre Gillain, Brussels (BE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 16/202,849

(22) Filed: Nov. 28, 2018

(65) Prior Publication Data

US 2020/0163296 A1 May 28, 2020

(51) Int. Cl.
*G06N 3/04* (2006.01)
*H04L 29/08* (2006.01)
*A01G 9/02* (2018.01)

(52) U.S. Cl.
CPC ........... *G06N 3/0454* (2013.01); *A01G 9/023* (2013.01); *H04L 67/12* (2013.01)

(58) Field of Classification Search
CPC .......... A01G 9/26; A01G 7/04; A01G 27/003; A01G 31/02; A01G 7/045; A01G 9/249; G06N 3/02; G06N 3/04
See application file for complete search history.

(56) References Cited

U.S. PATENT DOCUMENTS

| 7,910,800 B2 | 3/2011 | Karchi et al. |
| 8,533,993 B2 * | 9/2013 | Pettibone ............. A01G 31/042 47/65 |

(Continued)

FOREIGN PATENT DOCUMENTS

| CA | 2639023 | 3/2010 |
| KR | 101766364 | 8/2017 |
| WO | 2017103922 | 6/2017 |

OTHER PUBLICATIONS

Anonymous, "The CropTrak Mobile App", https://icroptrak.com/the-app/, CropTrak, accessed Sep. 20, 2018, 4 pages.

(Continued)

*Primary Examiner* — Magdalena Topolski
*Assistant Examiner* — Shada Mohamed Alghailani
(74) *Attorney, Agent, or Firm* — James Nock; Andrew D. Wright; Roberts Calderon Safran & Cole, P.C.

(57) ABSTRACT

Systems and methods for neural network forecasting for tiered hydroponic farming configurations are disclosed. In embodiments, a computer-implemented method includes: determining, by a computing device, ecology factors associated with a plant of interest; determining, by the computing device, beneficial interdependencies of the ecology factors associated with the plant of interest using an artificial neural network system; and generating, by the computing device, an ecology framework for the plant of interest within a cultivation system based on the beneficial interdependencies of the ecology factors, wherein the ecology framework reflects ecological conditions desired to promote healthy growth of the plant of interest.

19 Claims, 8 Drawing Sheets

(56) References Cited

U.S. PATENT DOCUMENTS

| | | | | |
|---|---|---|---|---|
| 9,345,201 | B2* | 5/2016 | Sakura | A01G 9/083 |
| 9,603,316 | B1* | 3/2017 | Mansey | G05B 15/02 |
| 9,880,537 | B2* | 1/2018 | Mewes | A01G 25/167 |
| 10,028,451 | B2* | 7/2018 | Rowan | A01C 21/005 |
| 10,136,587 | B1* | 11/2018 | Johnson | A01G 9/18 |
| 10,798,891 | B2* | 10/2020 | Allen | A01G 25/167 |
| 2004/0111965 | A1* | 6/2004 | Agius | A01G 31/042 47/62 R |
| 2011/0067301 | A1 | 3/2011 | DeMitchell et al. | |
| 2016/0232621 | A1* | 8/2016 | Ethington | G06Q 50/02 |
| 2016/0235014 | A1* | 8/2016 | Donham | A01G 9/26 |
| 2016/0253595 | A1* | 9/2016 | Mathur | G06N 7/005 706/12 |
| 2016/0262324 | A1* | 9/2016 | Yamane | A01G 7/04 |
| 2016/0371830 | A1* | 12/2016 | Barrasso | G06K 9/00 |
| 2018/0014486 | A1* | 1/2018 | Creechley | A01G 7/045 |
| 2018/0027725 | A1* | 2/2018 | Koutsorodi | A01B 79/005 |
| 2018/0211156 | A1* | 7/2018 | Guan | G06Q 10/06 |
| 2018/0220604 | A1* | 8/2018 | Zemach | A01G 9/029 |
| 2018/0290944 | A1* | 10/2018 | Do | A01K 67/0332 |
| 2018/0348186 | A1* | 12/2018 | Benfey | G01N 27/226 |
| 2019/0098849 | A1* | 4/2019 | Taylor | A01G 27/003 |
| 2019/0113495 | A1* | 4/2019 | Gabay | H04N 7/183 |
| 2019/0133026 | A1* | 5/2019 | Seaman | H04L 29/06 |
| 2019/0166770 | A1* | 6/2019 | Spiro | A01G 9/26 |
| 2019/0166771 | A1* | 6/2019 | Spiro | A01G 9/023 |
| 2019/0259108 | A1* | 8/2019 | Bongartz | G06Q 50/02 |
| 2019/0281771 | A1* | 9/2019 | Setton | A01G 9/143 |
| 2019/0297799 | A1* | 10/2019 | LaRue | A01G 25/167 |
| 2019/0333214 | A1* | 10/2019 | Haneda | G06K 9/00496 |
| 2019/0343055 | A1* | 11/2019 | Sakakibara | A01G 9/02 |
| 2019/0350140 | A1* | 11/2019 | Werner | G10K 11/18 |
| 2019/0380283 | A1* | 12/2019 | Chong | A01G 9/023 |
| 2020/0022318 | A1* | 1/2020 | Adams | A01G 9/24 |
| 2020/0084983 | A1* | 3/2020 | Liang | A01G 31/02 |
| 2020/0100442 | A1* | 4/2020 | Raymond | A01M 31/002 |
| 2020/0154659 | A1* | 5/2020 | Craig | A01G 9/02 |
| 2020/0163297 | A1* | 5/2020 | Newitt | A01G 31/02 |
| 2020/0184153 | A1* | 6/2020 | Bongartz | G05B 15/02 |

OTHER PUBLICATIONS

Asst Editor, "Farmer suicides: A global phenomenon", http://pragati.nationalinterest.in/2015/05/farmer-suicides-a-global-phenomena/, PRAGATI, May 6, 2015, 4 pages.

Ulaby et al., "Land Cover Classification by SAR", 1994 IEEE, 1994, 1 pages.

Renton, "What is the Appropriate Level of Detail for Modelling Agro-Ecological Processes in a Land-Use Optimisation Model?", 2010 IEEE, 2009 Plant Growth Modeling and Applications, 2009, 4 pages.

Sayama et al., "Modeling complex systems with adaptive networks", Computers and Mathematics with Applications, Elsevier, 2012, 20 pages.

Op 't Land et al., "Enterprise Ontology Based Splitting and Contracting of Organizations", SAC'08, Fortaleza, Ceará, Brazil, Mar. 16-20, 2008, 8 pages.

Land et al., "Measuring Cluster Stability in a Large Scale Phylogenetic Analysis of Functional Genes in Metagenomes Using", IEEE/ACM Transactions on Computational Biology and Bioinformatics, vol. 13, No. 2, Mar./Apr. 2016, 9 pages.

* cited by examiner

NEURAL NETWORK FORECASTING FOR TIERED HYDROPONIC NATURAL FARMING CONFIGURATIONS

BACKGROUND

The present invention relates generally to data analytics and, more particularly, to neural network forecasting for tiered hydroponic natural farming configurations.

Wireless data collected from sensors is being utilized in a variety of farming and horticultural environments, including vertical and hydroponic farming systems. Some multi-level growing systems have been developed with the ability to move plants within a tiered growing system.

Ecological systems are generally considered among the most complex because, among other things, they are characterized by a large number of diverse components and nonlinear interactions. Various methods for modeling ecological systems have been utilized in an attempt to better understand biological systems.

A recurrent neural network (RNN) is a class of artificial neural network where connections between nodes form a direct graph along a sequence. In RNNs, a chunk of neural network looks at some input and outputs a value. A loop allows information to be passed from one step of the network to the next. A long short-term memory (LTSM) network is a kind of RNN capable of learning long-term dependencies.

SUMMARY

In an aspect of the invention, a computer-implemented method includes: determining, by a computing device, ecology factors associated with a plant of interest; determining, by the computing device, beneficial interdependencies of the ecology factors associated with the plant of interest using an artificial neural network system; and generating, by the computing device, an ecology framework for the plant of interest within a cultivation system based on the beneficial interdependencies of the ecology factors, wherein the ecology framework reflects ecological conditions desired to promote healthy growth of the plant of interest.

In another aspect of the invention, there is a computer program product including a computer readable storage medium having program instructions embodied therewith. The program instructions are executable by a computing device to cause the computing device to: determine ecology factors associated with a plant of interest; determine beneficial interdependencies of the ecology factors associated with the plant of interest using an artificial neural network system, including: inputting qualitative ecology data to an encoder to produce word encodings; inputting the word encodings into a long-short term memory (LSTM) neural network to produce a vector output; inputting quantifiable ecology data and the vector output into a convolutional neural network (CNN) to produce a main output; and analyzing the main output to determine the beneficial interdependencies of the ecology factors. The program instructions further cause the computing device to generate an ecology framework for the plant of interest within a cultivation system based on the beneficial interdependencies of the ecology factors. The ecology framework reflects ecological conditions desired to promote healthy growth of the plant of interest.

In another aspect of the invention, there is a system including: a processor, a computer readable memory and a computer readable storage medium associated with a computing device; program instructions to determine ecology factors associated with a plant of interest in a cultivation system; program instructions to determine beneficial interdependencies of the ecology factors associated with the plant of interest using an artificial neural network system, wherein the beneficial interdependencies include beneficial interdependencies between at least one secondary plant within the cultivation system; and program instructions to generate an ecology framework for the plant of interest within the cultivation system based on the beneficial interdependencies of the ecology factors, wherein the ecology framework reflects ecological conditions desired to promote healthy growth of the plant of interest within the cultivation system. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
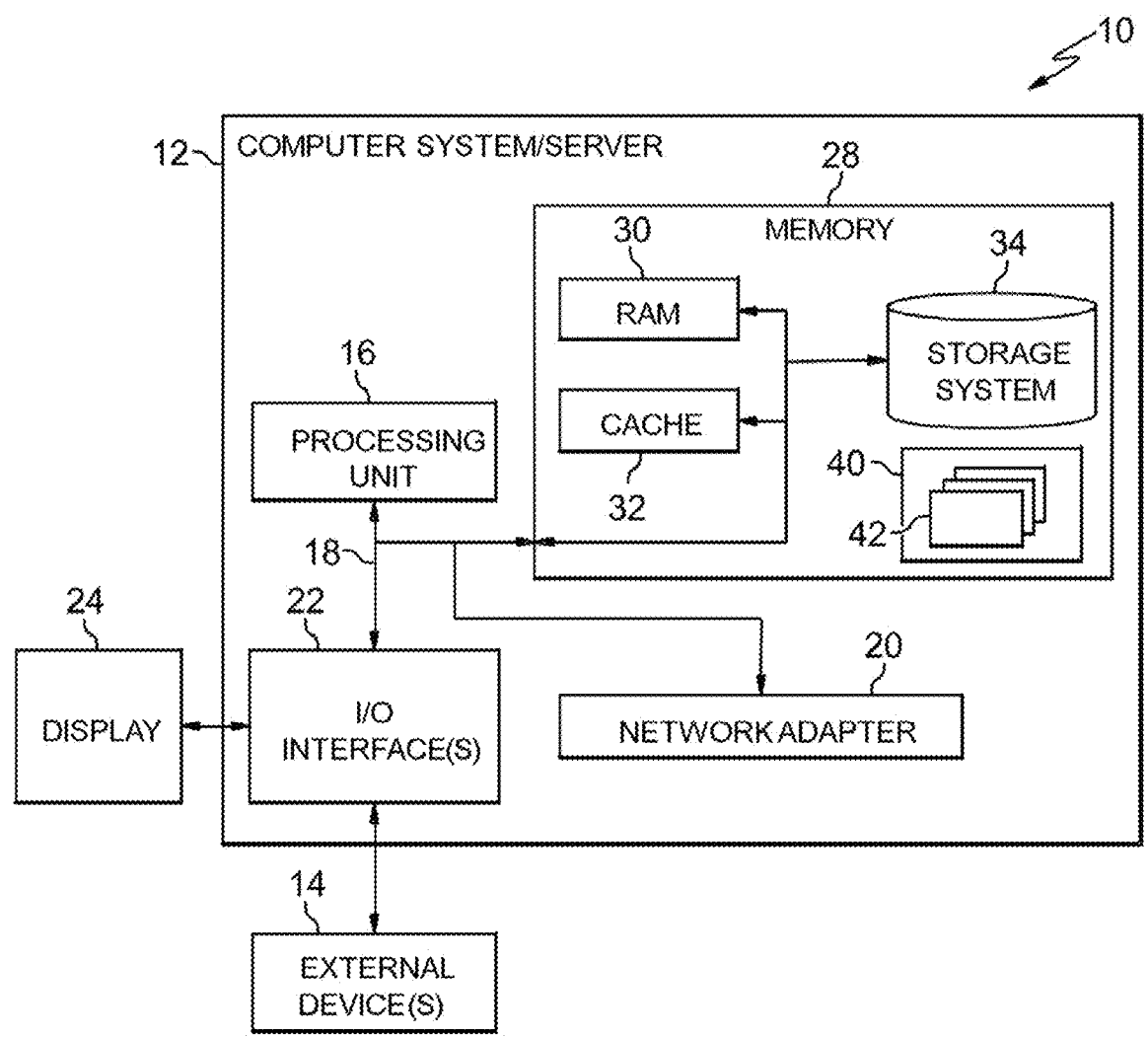
FIG. 1 depicts a computing infrastructure according to an embodiment of the present invention.

The present invention relates generally to data analytics and, more particularly, to neural network forecasting for tiered hydroponic natural farming configurations. In embodiments, a cognitive server generates an ecology framework for plant cultivation based on beneficial interdependencies derived from an artificial neural network. In embodiments, above-ground hydroponic tiers of plants are configured to be repositionable with respect to one other, based on determined beneficial interdependencies. Further, embodiments of the invention provide cultivation systems combining in-ground crops with above-ground hydroponic crops, wherein analytics are utilized to: optimize crop growth utilizing the z dimension to grow hydroponic crops; and determine optimal relative locations of in-ground and above-ground crops (e.g., to allow more sunlight or provide shade), based on interactions of the crops. Moreover, embodiments of the invention identify beneficial interdependencies of ecology factors related to a plant of interest, and use the beneficial interdependencies to generate an ecology framework within which to cultivate the plant of interest. The term ecology factor as used herein refers to biological or environmental data relevant to interactions among organisms in an environment (e.g., a cultivation system of the present invention).

Many times, strategic decision making in farming takes an approach that leads to unintended detrimental consequences, which can negatively impact the economy of farmers as well as a country as a whole. For example, farmers are sometimes advised to cultivate certain crops to obtain short-term benefits, which result in long term detrimental impacts to the land. In a specific example, one region increased soybean cultivation en masse due to high demand in another region. After a few years of soybean farming, the land became barren, and the soil lost all of its natural ability to sustain rice farming due to the nature of soybean plants and associated fertilizer usage, which impacted the local microbe population. Interestingly, research has found that growing cotton after soybeans can increase productivity of a portion of land. Similarly, after growing cereal grains and peas, growing wheat on the same land will increase productivity. These examples illustrate the benefits of identifying beneficial interdependencies between plants.

Along with the decision regarding which crops to plant, researchers are always interested in ways to increase productivity. Typically, horticulture researchers are focused on improvements in fertilizers, genetic modifications to vegetation, insecticides, and modifying soil conditions to address food production challenges. However, there is a general desire to decrease reliance on fertilizers, insecticides and genetically modified plants in farming. In pursuit of that goal, there is a need to identify natural conditions that promote the growth of different plants. One source of inspiration is a forest, where each plant growing therein growths well without human interference because the plants are provided with natural conditions that promote their growth. Identifying beneficial interactions for one particular plant in such complex systems is difficult.

Accordingly, there is a need to understand and recognize beneficial and detrimental cultivations cycles, and relationships between different crops. For example, there is a need to identify sequences of crop cultivation, which produce beneficial results (e.g., identify which sequential crops are complimentary). Cultivation cycles and outcomes thereof that are not readily apparent to an observer, may be identified utilizing neural network analysis of historic and real-time data utilizing systems and methods of the present invention.

Advantageously, embodiments of the invention enable the implementation and maintenance of a natural farming environment for the cultivation of any desired plant, such that the natural farming environment requires little intervention during cultivation once the ecological framework for the plant is established. Thus, implementations of the invention provide for a high probability of better crops at a relatively low investment. To this end, embodiments of the invention provide systems and method for identifying interdependencies of complex cultivation systems utilizing deep neural networks and recurrent neural networks. In embodiments, systems and methods provide a technical solution to the technical problem of designing and managing complex cultivation systems. Moreover, embodiments of the invention provide a technical solution to the problem of finite land resources by enabling cultivation system design for diverse geographic regions. Such implementations enable an ecology framework established by the invention to be utilized repeatedly by different cultivators/farmers in the same environment (e.g., geographic region).

Advantageously, embodiments of the invention utilize a feedback system for self-learning, enabling improvement over time to ecology frameworks developed by systems of the present invention.

Additionally, embodiments of the invention enable the design, management and optimization of cultivation systems including a multi-tiered hydroponic component. In aspects, unconventional neural network systems are utilized to determine configurations of different tiers and inputs to the multi-tiered hydroponic component to produce the most beneficial outcome based on multiple biological components in the overall cultivation system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
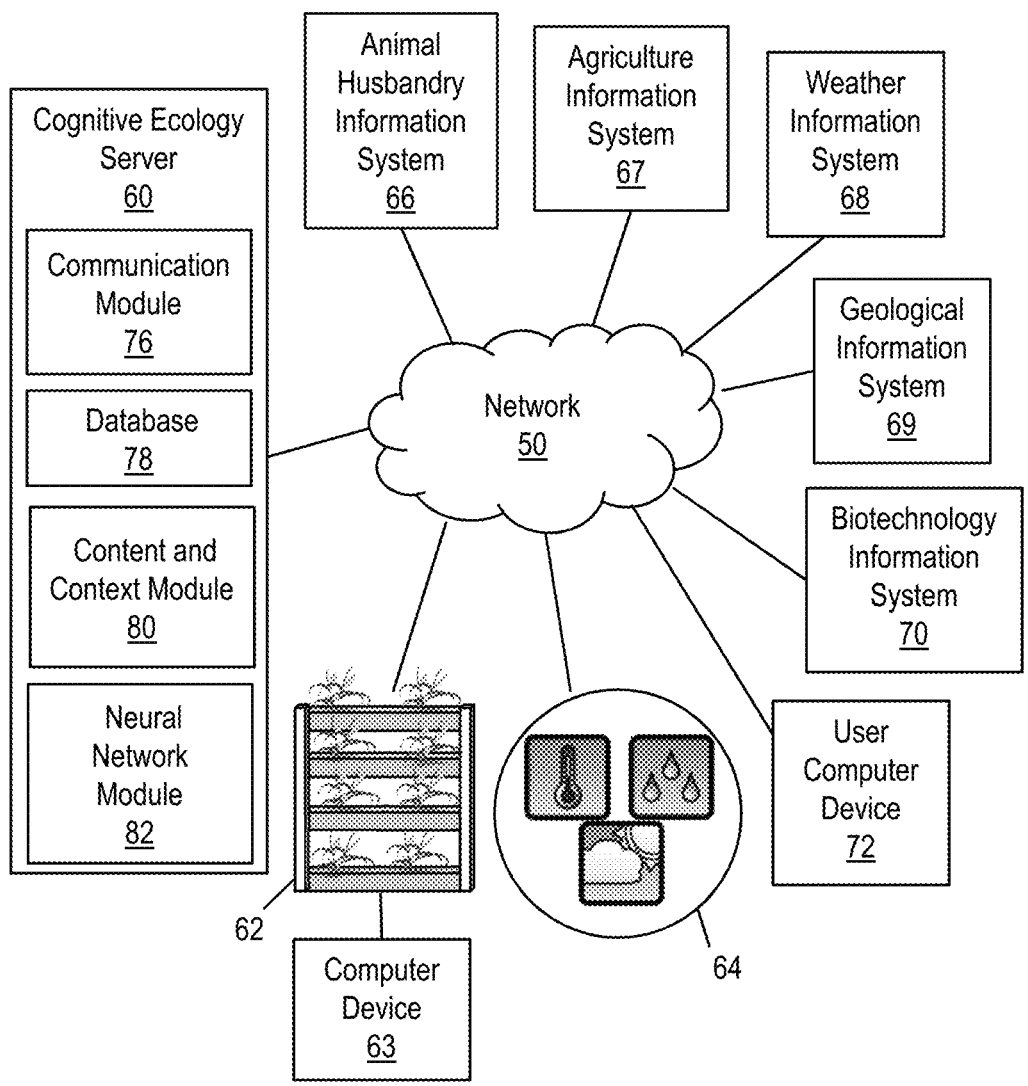
FIG. 2 shows an exemplary environment in accordance with aspects of the invention.

FIG. 2 shows an exemplary environment in accordance with aspects of the invention. The environment includes a network 50 connecting a cognitive ecology server 60 (hereafter cognitive server 60) to a cultivation system 62, a plurality of sensors represented at 64, one or more ecology data providers represented at 66-70, and one or more user computer devices 72. In the example, shown, the cognitive server 60 obtains data from one or more of the following: an animal husbandry information system 66; an agriculture information system 67; a weather information system 68, a geological information system 69; and a biotechnology information system 70.

The network 50 may be any suitable communication network or combination of networks, such as a local area network (LAN), a general wide area network (WAN), and/or a public network (e.g., the Internet). In embodiments, the cognitive server 60 comprises the computer system 12 of FIG. 1, and is connected to the network 50 via the network adapter 20 of FIG. 1. The cognitive server 50 may be configured as a special purpose computing device that is part of a service provider infrastructure. For example, the cognitive server 60 may be configured to receive ecology data from a plurality of sources (e.g., information systems 66-70), and provide customized ecology framework data to a plurality of client devices (e.g., user computer device 72) via the network 50. In embodiments, the cognitive server 60 is a cloud-based server in communication with a plurality of user computer devices 72 via the network 50 (e.g., Internet). In alternative embodiments, the cognitive server 60 services an on-site client, and may be in communication with a user computer device 72 via an intranet (e.g., network 50).

In embodiments, the cognitive server 60 includes a plurality of modules (e.g., program module 42 of FIG. 1) executed by the cognitive server 60 and configure to perform one or more of the functions described herein. In aspects, a communication module 76 of the cognitive server 60 enables the cognitive server 60 to communicate with, and obtain data from, one or more of: a computer device 63 of the cultivation system 62, the sensors 64, the information systems 66-70, and the user computer device 72. In embodiments, the cognitive server 60 saves data (e.g., ecology data) in the database 78.

In embodiments, the cognitive server 60 includes a content and context module 80 configured to determine content and/or context of data received by the communication module 76. In aspects, the content and context module 80 utilizes: image processing tools to identify the content and/or context of images; speech-to-text tools to convert audio data to text-based data; and natural language processing (NLP) tools to determine the content and context of text-based data. Other machine learning tools may be utilized to determine the content and context of ecology data received by the cognitive server 60.

In embodiments, a neural network module 82 of the cognitive server 60 is configured to run ecology data through a layered neural network to obtain data regarding interdependencies of ecology factors with respect to a plant of interest. For example, layered neural networks of the present invention may be utilized to identify previously unrecognized beneficial relationships between a plant of interest and other plants, animal, microbes, insects, and growing conditions. The term growing conditions as used herein refers to environmental and/or physical conditions effecting the growth of a plant of interest, including temperature, water, nutrients, soil type, etc.

In embodiments, the cultivation system 62 is a farm comprising one or more of terrestrial plantings and hydroponic plantings. The cultivation system 62 may comprise indoor and/or outdoor cultivation components, and may include stationary and/or mobile cultivation components. In aspects, the cultivation system 62 includes a plurality of the sensors 64 configured to monitor ecology factors for the cultivation system 62 in real-time. The cultivation system 62 of the present invention may utilize hydroponic systems with mobile plant containers. Various cultivation devices may be utilized in the cultivation system 62 of the present invention, and the cultivation system 62 is not intended to be limited to the examples set forth herein.

Developments in precision farming and Internet of Things (IoT) technologies have led to commercialization of different types of sensors that can be utilized to monitor and optimize production of an agricultural product. Such sensors may be wireless networked sensors located on the ground or placed on manned or unmanned vehicles. Embodiments of the invention utilize a variety of sensors (e.g., sensors 64) to obtain pertinent ecology data for feedback into the overall system. In embodiments, electromechanical sensors provide the system (e.g., cognitive server 60, computer device 63 and/or user computer device 72) with information about soil texture, salinity, moisture and organic matter. In implementations, optical sensors are utilized to measure reflectance of a crop, and to determined information such as chlorophyll levels within plants, nitrogen levels within the plant, etc. In embodiments, mechanical sensors are utilized to measure soil resistance. Sensors 64 of the present invention may also provide information about pH level, nutrient levels, temperature, light intensity, relative humidity, and may be utilized to monitor pest traps.

It should be understood that any sensors 64 configured to gather ecology data useful in the implementation of steps discussed herein may be utilized in conjunction with the cultivation system 62, and need not be limited to the examples discussed herein. In embodiments, the sensors 64 are in communication with the computer device 63, which may be a server, laptop, desktop, tablet, smartphone, or other computer device configured to obtain sensor data from the sensors 64. In embodiments, the computer device 63 is configured to provide one or both of the cognitive server 60 and the user computer device 72 with data regarding the cultivation system 62, via the network, 50. In aspects, the computer device 63 is configured to automatically control various aspects of the cultivation system 62, including automated aspects of hydroponic devices within the cultivation system 62.

In aspects, the user computer device 72 includes components of the computer system 12 of FIG. 1. The user computer device 72 may be a laptop, desktop, tablet, smartphone, or other user computer device in communication with the cognitive server 60 via the network 50. In aspects, the sensors 64 are on-site sensors at the cultivation system 62, and are in communication with the user computer device 72 via the network 50. In embodiments, the user computer device 72 collects sensor data (e.g., real-time sensor data) from the sensors 64 and saves the sensor data in a database (not shown). In embodiments, the user computer device 72 provides saved sensor data or real-time data received from the sensors 64, to the cognitive server 60, continuously or periodically. In embodiments, the user computer device 72 collects sensor data from the computer device 63.

In embodiments, the information systems 66-70 provide different types of ecology data regarding ecology factors to the cognitive server 60. The term ecology factors as used herein refer to biological or environmental data relevant to interactions among organisms in an environment (e.g., cultivation system). Examples of ecology data that may be collected includes data related to a plant's optimal growing conditions including light exposure, temperature exposure, nutrients, water/moisture requirements, predators, etc. By way of example, in embodiments: an animal husbandry information system 66 provides information regarding animal husbandry ecology factors to the cognitive server 60; an agriculture information system 67 provides ecology factors relevant to agricultural systems to the cognitive server 60; a weather information system 68 provides information regarding weather/environmental conditions that may impact an ecological system (e.g., cultivation system 62) to the cognitive server 60; a geological information system 69 provides geological information (e.g., mineral makeup of particular soil regions) to the cognitive server 60; and a biotechnology information system 70 provides information regarding microbes (e.g., microbes relevant to the cultivation system 62) to the cognitive server 60.

The quantity of devices and/or networks in the environment of FIG. 2 is not limited to what is shown in FIG. 2. In practice, the environment may include additional devices and/or networks; fewer devices and/or networks; different devices and/or networks; or differently arranged devices and/or networks than illustrated in FIG. 2. In addition, in some implementations, one or more of the devices of the environment may perform one or more functions described as being performed by another one or more of the devices of the environment of FIG. 2. Devices of the environment may interconnect via wired connections, wireless connections, or a combination of wired and wireless connections.

It should be understood that systems and methods of the present invention may be utilized in the cultivation of any plant of interest. In a first use case, the food crop rice is considered. Rice is the most consumed food ingredient in some regions. A variety of rice is cultivated in different parts of Asia; out of this rice, almost 90% of the cultivation happens in wetlands. With projected population growth, the demand for rice is projected to go up by 30%+; however, there is little available land to expand cultivation. Therefore, it is important to (i) increase the productivity of the rice within the same space and/or (ii) understand the science of rice cultivation to prepare other lands and environments for cultivation. Current solutions to increase of productivity of rice within the same space include the use of fertilizer, insecticides, high-end machinery, or genetically modified plants.

A common trend in agriculture is to utilize chemical fertilizers in an attempt to boost productivity of crops. However, chemical fertilizers have been found to have a detrimental effect to the soil in some situations. In one example, chemical fertilizers have been found to reduce the microbial content of the soil, which can result in a loss of vital minerals within the soil. In some situations, soil conditions can deteriorate to the point that land becomes barren.

In order to protect crops from insects, crops are commonly fogged with insecticide. However, insecticides may reduce the pollination of crops as pollinating insects are killed or driven away from the crops by the insecticides. The use of expensive machinery can enhance cultivation in large volumes; however, the use of such machinery is not always feasible, such as when land conditions or the size of the land is not conducive to the use of such machines. Moreover, genetic changes to plants can increase productively. However, genetically modified crops raise concerns among some.

Natural processes that can be beneficial to the cultivation of crops include the presence of beneficial microbes, enhancing natural pollinators, and creating a desirable ecology for each of the crops. Microbes play key roles in the biosphere, particularly in the areas of element biotransformation and biogeochemical cycling, metal and mineral transformations, decomposition, bio weathering, and soil and sediment formation (e.g., by composting plant and animal waste directing on the land of cultivation). However, microbes exist which can have a negative impact on soil for cultivation. Microbial density can be increased by diversifying the variety of plants in and around cultivating lands. Moreover, the presence of microbes and worms may lead to cost savings on machinery, since no plugging of fields may be required for cultivation.

Effective pollination also increases the productivity of rice and other crops. Insects pollinate the majority of our cultivated crop species. If certain pollinating insects are enhanced, productivity can be increased (e.g., flower cultivation close to rice lands, that attracts bees, can help increasing the pollination of rice plants).

Healthy animal-plant ecosystems contribute to crop success. For example, grasshoppers that detrimentally effect rice crops are controlled by populations of birds and reptiles. Similarly, many weeds, which some might think harmful to rice cultivation, actually help encourage beneficial microbes and retain moisture in the soil, thus promoting the growth of the rice. Another way of increasing the production of rice is to explore other lands, and adjust conditions of these new lands to be suitable for rice cultivation. While it may be impossible or impracticable to make new land similar to existing wetland rice fields, natural cultivation factors can be utilized to make the new land suitable for rice cultivation. This may be achieved through irrigating in a controlled manner and utilizing weeds and organic waste (e.g., leaves) to keep the soil cool, which can help retain the necessary high moisture levels for rice cultivation with the minimal amount of water.

Additionally, hydroponic methods of rice cultivation may utilize recycled water with control of required minerals and other environmental factors to enhance productivity. In embodiments, flower cultivation around rice fields is utilized as a technique for increasing the productivity of the rice fields through effective pollination, without using more land space.

Figure 3:
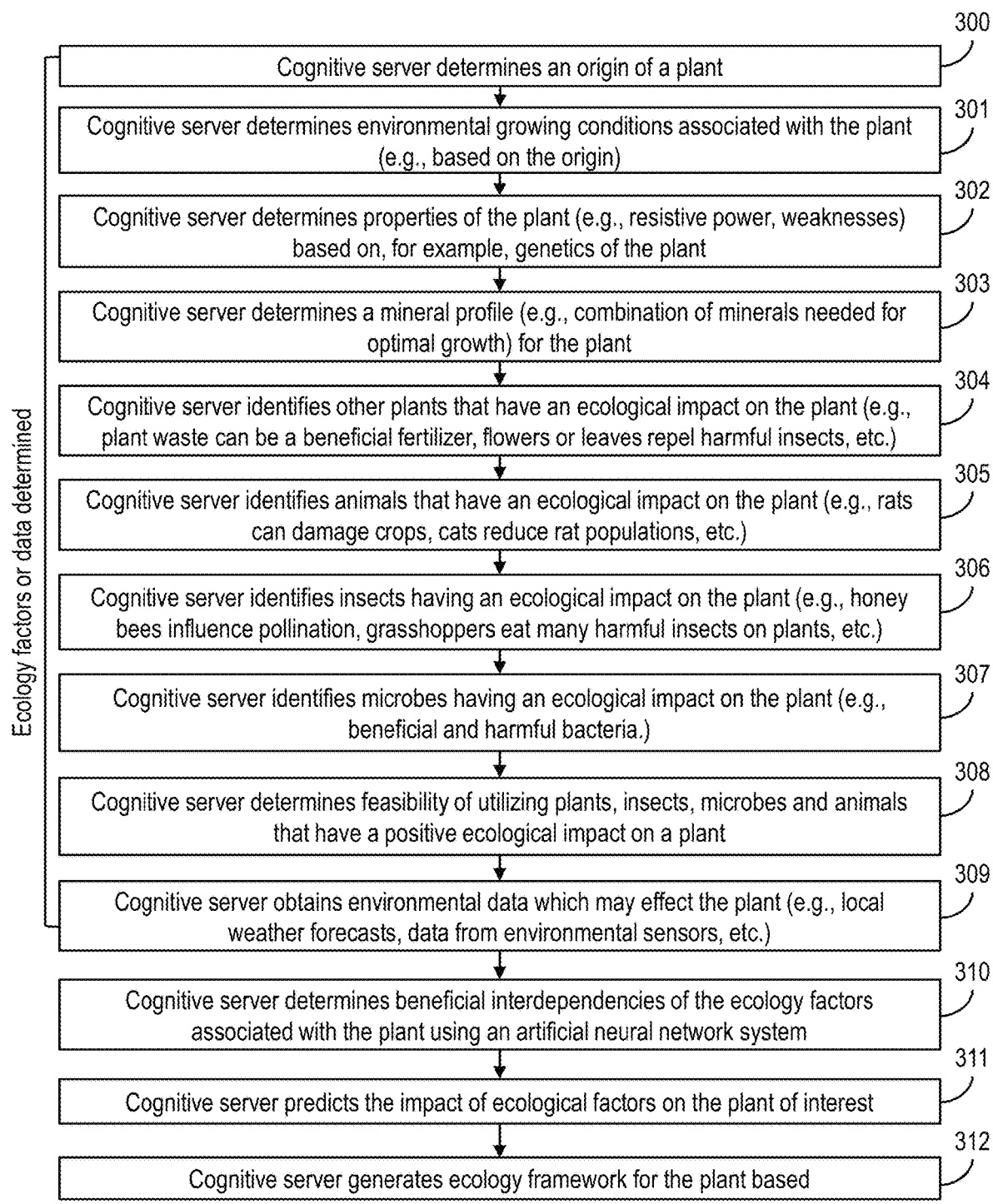
FIG. 3 show a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At steps 300-309, the cognitive server 60 determines ecology data regarding ecology factors for one or more plants of interest. Plants of interest may be, for example, varieties of rice plant, or other plants to be cultivated. Plant growth is affected by at least the following parameters: minerals in the soil (e.g., at different depths); weather/environmental conditions; microbes in the soil (e.g., microbes that assist in transportation of mineral to the root of a plant); friendly and unfriendly plants within the same environment; friendly and unfriendly animals and/or insects within the same environment; origins of the plant; genetic properties of the plant; and more. In aspects, the cognitive server 60 utilizes ecology data from one or more of the information systems 66-70 of FIG. 2 in the performance of steps 300-309. Specific examples of ecology data determined by the cognitive server 60 in accordance with embodiments of the invention will now be discussed with respect to individual steps 300-309. Steps 300-309 may be conducted prior to the establishment of a cultivation system 62 in order to provide an ecology framework upon which a cultivation system 62 may be built, or may be conducted based on one or more plants of interest (e.g., plants to be cultivated) in an existing cultivation system 62.

At step 300, the cognitive server 60 determines an origin of a plant of interest. For example, in embodiments, the cognitive server 60 utilizes data from an agriculture information system 67 to determine native originals of a particular plant or type of plant. An original habitat of a plant or type of plant provides the cognitive server 60 with information regarding, for example, ecology factors (e.g., environmental factors) conducive to cultivation of the plant. For example, rice plants originating from a particular geographic location would have characteristics conducive to cultivation in ecological conditions that are the same or similar to those of the particular geographic location.

At step 301, the cognitive server 60 determines environmental growing conditions associated with the plant of interest. The server may determine environmental growing conditions associated with the plant of interest based on, for example, the origin of the plant determined at step 300.

At step 302, the cognitive server 60 determines properties of the plant of interest (e.g., resistive power, weaknesses, etc.). In aspects, the cognitive server 60 utilizes the origin of the plant determined at step 300 in determining the properties of the plant of interest. In embodiments, the cognitive server 60 determines genetic properties of the plant of interest, wherein the genetic properties reveal traits of the plant such as drought tolerance, susceptibility to diseases, etc.

At step 303, the cognitive server 60 determines a mineral profile for the plant of interest. The term mineral profile as used herein refers to a combination of minerals (types and amounts) that are necessary for healthy growth (e.g., optimal growth) of the plant of interest.

At step 304, the cognitive server 60 identifies other plants that have an ecological impact on the plant. For example, plant waste from a first plant may be a beneficial fertilizer to a second plant, or flowers or leaves of a first plant may repel insects that are harmful to a second plant. In aspects, the cognitive server 60 compiles a list of plants whose life cycle (e.g., parasites, roots, leaves, seeds, flowers, waste, etc.), may be beneficial or harmful to a plant of interest, directly or indirectly, based on explicit data and/or implicit data.

At step 305, the cognitive server 60 identifies animals that have an ecological impact on the plant of interest. In aspects, the cognitive server 60 compiles a list of animals whose life cycles (e.g., food habits, waste, etc.) may be beneficial or harmful to the plant of interest, directly or indirectly, based on explicit data and/or implicit data. For example, the cognitive server 60 may determine based on data received from an agricultural information system 67, that rats can damage crops of the plant of interest, and that cats reduce the rat population.

At step 306, the cognitive server 60 identifies insects having an ecological impact on the plant of interest. In aspects, the cognitive server 60 compiles a list of insects whose life cycles (e.g., food habits, waste, pollinating habits, etc.) may be beneficial or harmful to the plant of interest, directly or indirectly, based on explicit data and/or implicit data. For example, the cognitive server 60 may determine based on data received from the agricultural information system 67, that honey bees pollinate the plant of interest, and that grasshoppers eat many harmful insects that feed on the plant of interest.

At step 307, the cognitive server 60 identifies microbes having an ecological impact on the plant of interest. Microbes, or microorganisms, are small organisms that cannot be seen with the unaided eye. Microbes may be unicellular or multicellular, and may exist alone or in colonies. Microbes can be found in all kinds of environments, including cold climates, hot springs, deserts, marshy lands, etc. Microbes may also be found inside the bodies of other organisms. Microbes like bacteria decompose organic waste into manure and may increase the fertility of soil. Microbes may help fix atmospheric nitrogen into nitrogen compounds in the soil, and thereby increase the fertility of the soil. Microbes may also bring the mineral dip in soil to the root of plants, which may increase the fertility of the soil and resistance of the plant to certain ailments. Microbes (pathogens) may also cause disease in plants and animals. Some microbes grow in food substances and produce toxins that make the food poisonous to animals and/or humans, and the resulting food poisoning can cause illness. Microbes can be friendly or deadly to a plant, depending on the type of plant. The type of microbes present changes with soil culture, weather, and minerals in the soil, for example. In embodiments of the invention, information regarding microbes from the biotechnology information system 70 is utilized by the cognitive server 60 to make decisions to facilitate beneficial bacteria in soil for a specific one or more plants of interest.

Still referring to step 307, in aspects, the cognitive server 60 compiles a list of microbes whose life cycles (e.g., food habits, waste, etc.) may be beneficial or harmful to the plant of interest, directly or indirectly, based on explicit data and/or implicit data. For example, the cognitive server 60 may determine based on data received from the biotechnology information system 70, that a certain microbe act as a mediator in the soil to transport a mineral to top layers of the soil close to the roots of plants, and help the plant of interest obtain required nutrients.

At step 308, the cognitive server 60 determines the feasibility of using plants, insects, microbes, and animals that have a positive ecological impact on the plant of interest. For example, using an animal (e.g., domestic cats to catch rats) may not be feasible in a particular location that has been determined to be ideal for the growth of the plant of interest. In another example, the environment selected for growing the plant of interest may not be conducive to the life of another plant, insect, microbe or animal determined to have beneficial properties with respect to the plant of interest. In embodiments, the cognitive server 60 generates a list of plants, insects, microbes and/or animals that may feasibly be utilized in the cultivation system 62, and which are beneficial to the plant of interest (e.g., have a positive ecological impact on the plant of interest).

At step 309, the cognitive server 60 obtains environmental data which may affect the plant of interest. In embodiments, the cognitive server 60 obtains environmental data for environmental parameters associated with one or more physical locations (e.g., the location of the cultivation system 62). Environmental data may include, for example, local weather forecasts (e.g., heat, sunlight, rain, snow, etc.), and data from environmental sensors (e.g., sensors 64). In aspects, the cognitive server 60 determines the impact of the environmental parameters (individually, and/or cumulatively) on the plant of interest.

At step 310, the cognitive server 60 determines beneficial interdependencies of the ecology factors associated with the plant of interest using an artificial neural network system of the neural network module 82. In aspects, the neural network module 82 assembles recurrent neural networks (RNNs) for different forecasting lengths (e.g., short-term, mid-term and long-term forecasting); performs an evaluation of different hydroponic system configurations, each configuration including given ecology factors (e.g., animals, weather, supply/demand, soil nutrients, growth trends, and human feedback) through RNNs and LTSMs; merges forecasts of hierarchical features into a base evaluation RNN; and reorganizes the RNN with weights to match actual hydroponic system parameter levels. In aspects, the cognitive server 60 enables transfer learning to reduce the amount of supervised training required by the system. The term transfer learning as used herein refers to a method of training a cognitive system that leverages already existing labeled data of some related task or domain. Knowledge gained in solving a source task is stored and applied to another problem of interest.

At step 311, the cognitive server 60 predicts the impact of ecological factors on the plant of interest. In embodiments, the cognitive server 60 utilizes determined beneficial interdependencies of step 310 to predict the impact of ecological factor on the plant of interest for a number of different scenarios. For example, the cognitive server 60 may predict the impact of ecological factors on a plant of interest in a first scenario at a first location associated with particular ecological factors, and for a second location associated with another set of ecological factors. In aspects, the cognitive server 60 predicts the impact of various configurations of ecology factors for the plant of interest, including different positioning of elements within the cultivation system 62 (e.g., different organisms at different tiers within a multi-tiered hydroponic device within the cultivation system 62).

At step 312, the cognitive server 60 generates an ecological framework for the plant of interest. The term ecological framework as used herein refers to interrelated ecology data determined by the cognitive server 60 to provide a beneficial environment for the plant of interest. In aspects, the cognitive server 60 generates an ecological framework for cultivating the plant of interest at a particular location based on the beneficial interdependencies identified at step 310 and the predicted impact of ecological factors determined at step 311. Thus, in aspects, the cognitive server 60 utilizes information regarding which ecological factors are likely to be beneficial to a plant of interest, and generates an ecological framework comprising other plants, animals, insects, minerals, microbes and growth conditions (e.g., light, water, soil conditions, etc.) for use in a cultivation system (e.g., cultivation system 62). In aspects, the ecology framework may be utilized by a user to create a cultivation system (e.g., cultivation system 62). In other aspects, the ecology framework may be utilized by a user to improve/optimize an existing cultivation system (e.g., cultivation system 62). In embodiments, the cognitive server 60 saves the ecological framework (including associated ecology data related to optimal growing conditions for a plant of interest) in the database 78.

Advantageously, embodiments ecology frameworks generated by the cognitive server 60 constitute frameworks configured to address deficiencies in the proposed cultivation cite (physical location). For example, ecology frameworks of the present invention may establish cultivation practices configured to revive barren land, thus making the barren land suitable for cultivation over time at a relatively low cost. This may be implemented, for example, through the introduction of appropriate microbes and nutrients by the ecology framework.

Moreover, in embodiments of the invention, the cognitive server 60 considers economic factors (e.g., profitability of particular crops for a target market place and segment) in its generation of an ecology framework. For example, multiple beneficial secondary plants may be determined to be useful to a primary plant to be cultivated. In this case, the cognitive server 60 may determine a secondary plant to be utilized in an ecology framework based on economic factors, such as which secondary plant would be most profitable for a particular market.

Figure 4:
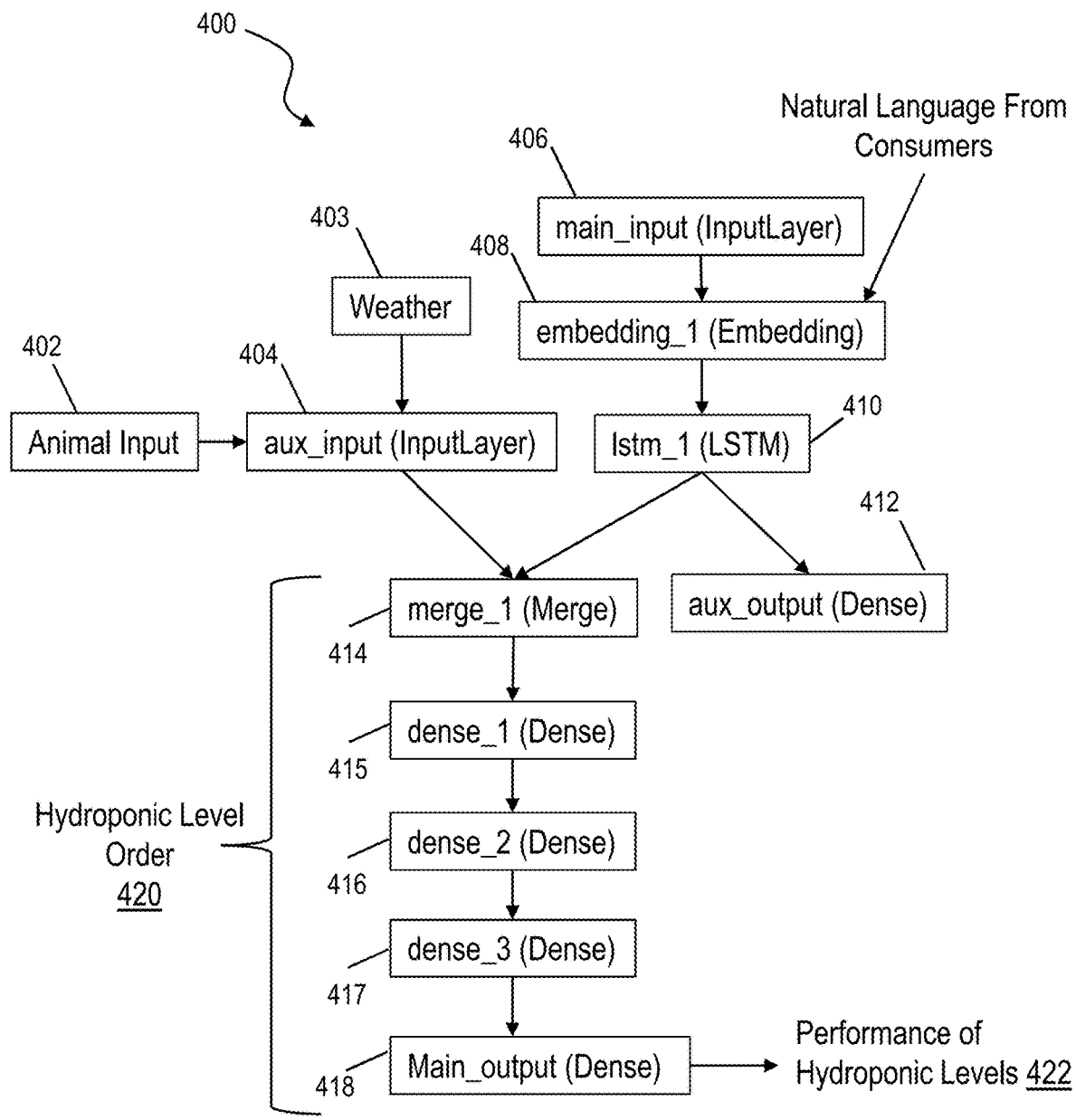
FIG. 4 is a flow diagram of a neural network system utilized in accordance with embodiments of the invention.

FIG. 4 depicts a layered neural network system 400 for use in embodiments of the invention. The neural network system 400 can be utilized in the environment of FIG. 2 to perform steps described with respect to FIG. 3.

In embodiments of the invention, the cognitive server 60 utilizes a neural network system 400. In aspects, the neural network system 400 comprises one or more convolutional neural networks (CNN) and long-short term memory (LSTM) neural network structures to implement steps of the invention. In aspects, the cognitive server 60 trains an artificial neural network using training response vectors derived from real-time sensor data (e.g., from sensors 64) from one or more cultivation systems 62, as well as information from a variety of third party sources. More specifically, in embodiments, the cognitive server 60 feeds quantitative feedback data (e.g., weather information 403 from sensor data) into a convolutional neural network (CNN) of the neural network module 82 as input (e.g., aux_input (Input Layer)) at 404. Additionally, the cognitive server 60 feeds qualitative feedback data (e.g., user input, consumer feedback, scientific studies, etc.) from a main_inpu (Input-Layer) 406 to an encoder represented at 408 to produce word encodings (e.g., text mapped to vectors or real numbers) using word embeddings (e.g., embedding_1 (Embedding)). A word embedding as used herein refers to a collective name for a set of language modeling and feature learning techniques in natural language processing (NLP) where words or phrases are mapped to vectors or real numbers.

The word encodings are fed into a LSTM 410 (e.g., lstm_(LSTM)), resulting in an auxiliary output (e.g., aux_output (Dense)) 412 or vector output. The term vector as used herein refers to a learning vector for input into an artificial neural network. The vector output is introduced to the hydroponic level CNN 420 at merge_1 (Merge) 414, and is fed to subsequent levels 415-417 before producing a main output 418 (e.g., Main_output (Dense)), which can be analyzed by the cognitive server 60 to determine performance parameters 422 for different hydroponic levels of a multi-tiered hydroponic system. In aspects, the performance parameters indicate levels of performance for an arrangement of the multi-tiered hydroponic system.

In embodiments, the neural network system 400 of the present invention utilizes the following details:
keras.layers.recurrent.Recurrent(weights=None, return_sequences=False, go_backwards=False, stateful=False, unroll=False, consume_less='cpu', input_dim=None, input_length=None)
as the First Layer in a Sequential Model
model=Sequential( )
model.add(LSTM(32, input_shape=(10, 64)))
    #now model.output_shape==(None, 32)
    #note: 'None' is the batch dimension.
    #the following is identical:
model=Sequential( )
model.add(LSTM(32, input_dim=64, input_length=10))
    #for subsequent layers, not need to specify the input size:
model.add(LSTM(16))
    keras.layers.recurrent.SimpleRNN(output_dim, init='glorot_uniform', inner_init='orthogona', activation='tan h', W_regularizer=None, U_regularizer=None, b_regularizer=None, dropout_W=0.0, dropout_U=0.0)

Figure 5:
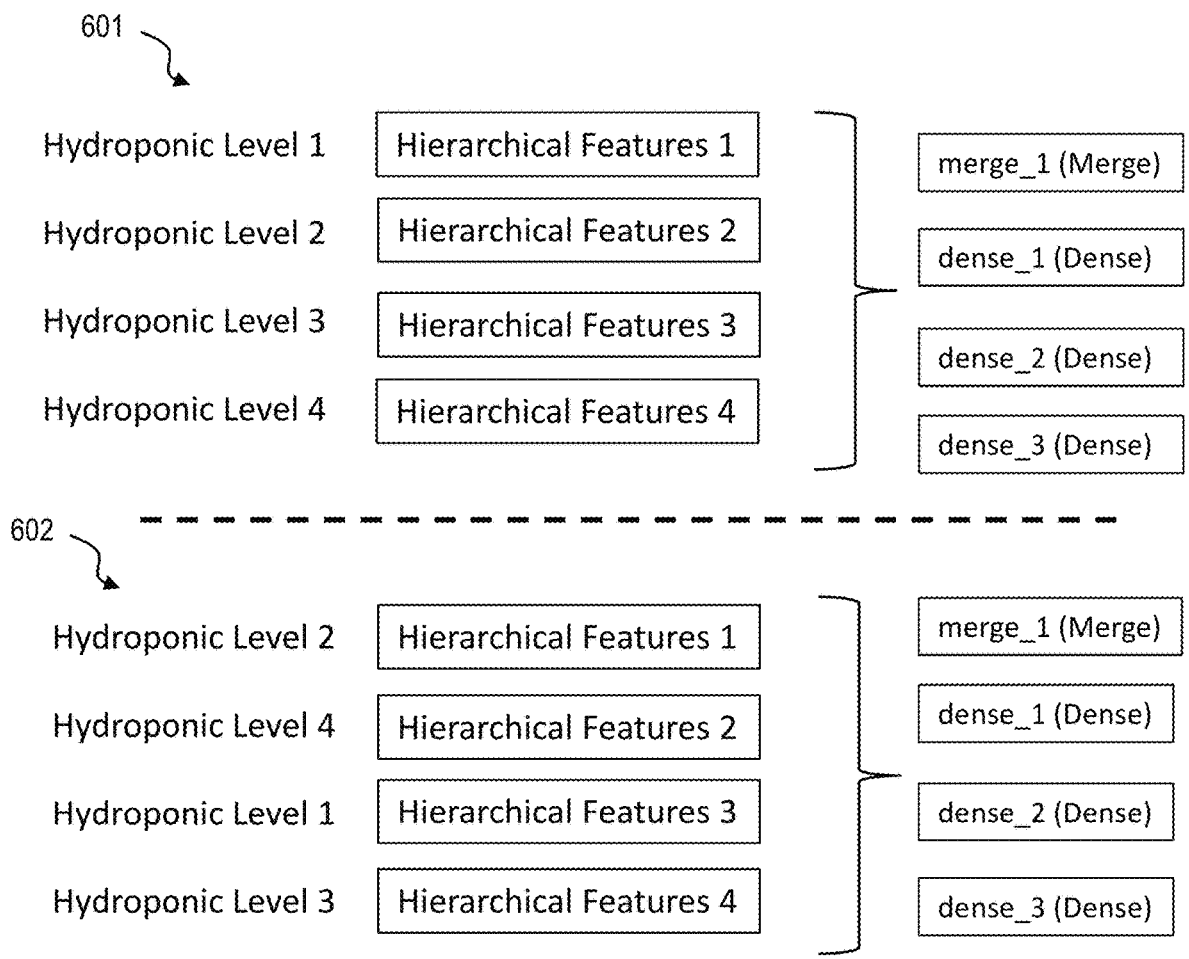
FIG. 5 depicts neural network processing of two different multi-tiered hydroponic system configurations.

FIG. 5 depicts neural network processing of two different multi-tiered hydroponic system configurations in accordance with embodiments of the invention. In embodiments, neural network system 400 of FIG. 4 is utilized to process different configurations of a multi-tiered hydroponic system of the cultivation system 62 to determine the best (optimal) configurations for a plant of interest. FIG. 5 illustrates the capacity of the present invention to use specifics (e.g., with respect to plants) of each layer of the multi-tiered hydroponic system of the cultivation system 62, to determine if movement of the layers is desirable. In the example shown, a first configuration 601 includes hydroponic levels 1-4, wherein each level is a different vertical tier or level of plant (e.g., planters or containers of a plant of interest). A second configuration 602, shows hydroponic levels 1-4 reconfigured in a different order in accordance with embodiments of the present invention.

Figure 6:
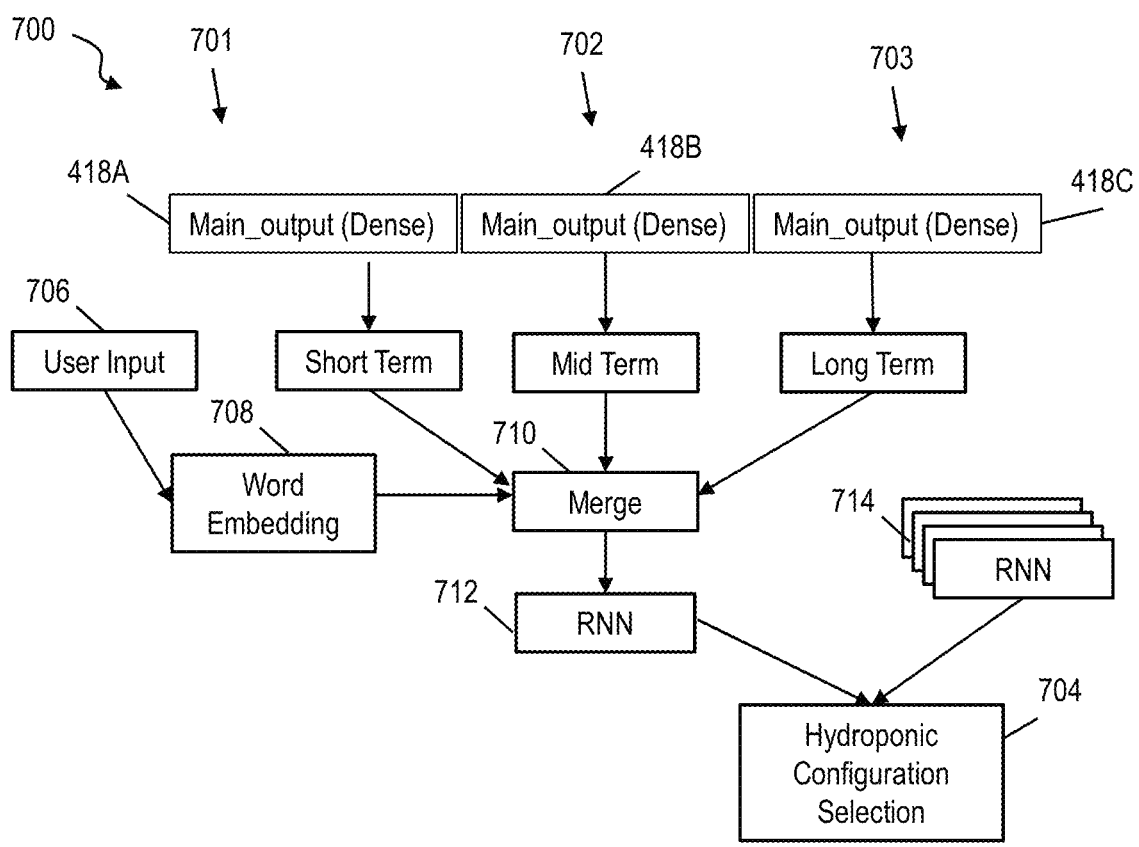
FIG. 6 depicts neural network processing system in accordance with embodiments of the invention.

FIG. 6 depicts neural network processing system 700 in accordance with embodiments of the invention. In embodiments, outputs (e.g., 701-703) from the neural network system 400 are combined to provide an final output 704 identifying a desired hydroponic configuration. In the example of FIG. 6, outputs 418A-418C from respective short-term 701, mid-term 702, and long-term 703 forecasts are processed by the neural network system 700 of FIG. 6.

In aspects, the cognitive server 60 (shown in FIG. 2) feeds user input data 706 in the form of qualitative feedback data to an encoder to produce word encodings (e.g., text mapped to vectors or real numbers) using word embeddings 708). The word encodings are fed into a merging LSTM 710, along with inputs from the short-term 701, mid-term 702, and long-term 703 forecasts, resulting in a vector output which is then fed to an RNN 712. The RNN 712 produces an output indicating a desired hydroponic configuration for a multi-tiered hydroponic system of the cultivation system 62. Likewise, other RNNs represented at 714 run forecasts based on different ecology factors to produce a desired hydroponic configuration. The cognitive server 60 may determine, based on outputs from the RNNs 712 and 714, the best overall (optimal) hydroponic configuration considering different ecology factors and different configurations of the multi-tiered hydroponic system. In aspects, the cognitive server 60 performs an evaluation of different hydroponic system configurations, each configuration including given ecology factors (e.g., animals, weather, supply/demand, soil nutrients, growth trends, and human feedback), and merges forecasts of hierarchical features into a base evaluation RNN (not shown). In embodiments, the base evaluation RNN reorganizes the forecast data with weights to match actual hydroponic system parameter levels.

Figure 7:
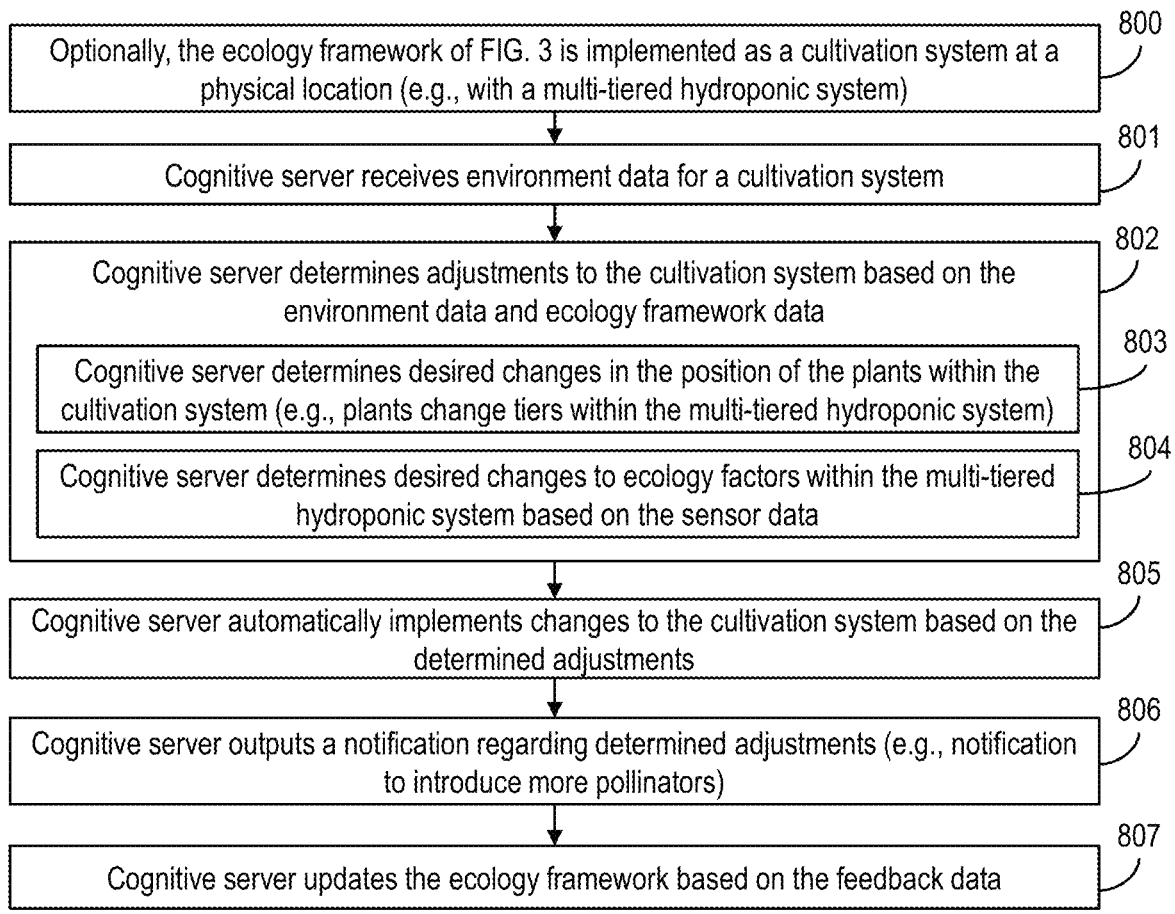
FIG. 7 is a flowchart of steps of a method according to embodiments of the invention.

FIG. 7 shows a flowchart of a method in accordance with aspects of the invention. Steps of the method of FIG. 7 may be performed in the environment illustrated in FIG. 2, and are described with reference to elements shown in FIG. 2.

Optionally, at step 800, an ecology framework generated by the cognitive server 60 in accordance with FIG. 3 is implemented as the cultivation system 62 at a physical location. In one example, the cultivation system 62 comprises at least one multi-tiered hydroponic system (above-ground cultivation) in conjunction with terrestrial cultivation (in-ground cultivation). Alternatively, the ecology framework generated by the cognitive server 60 can be applied to an existing cultivation system 62.

At step 801, the cognitive server 60 receives environment data for the cultivation system 62. In embodiments, the cognitive server receives sensor data regarding ecology factors from one or more sensors 64 associated with the cultivation system 62. For example, the sensor data may provide the cognitive server 60 with information regarding the location of one or more containers of a hydroponic device, moisture levels, light levels and nutrient levels. In implementations, environment data may be in the form of user input data (e.g., from the user computer device 72). For example, a user may input data regarding certain ecology factors not automatically captured by sensors, such as the number of certain animals within the cultivation system 62.

At step 802, the cognitive server 60 determines adjustments to the cultivation system 62 based on the environment data received at step 801 and the ecology data (ecology framework data) in the database 78. In accordance with embodiments of the invention, the cognitive server 60 determines desired changes to components of the cultivation system 62 and/or changes to ecology factors of the cultivation system 62.

Step 803 sets forth an example of a change to a component of the cultivation system 62 based on sensor data and ecology data associated with the cultivation system 62. In embodiments, the cognitive server 60 determines desired changes to the position of one or more plant containers within a multi-tiered hydroponic system. In one example, sensor data from the sensors 64 of the cultivation system 62 indicate that plants in a second tier of a multi-tiered hydroponic system are not getting enough light according to parameters established by the ecology framework for the cultivation system 62. In this example, the cognitive server 60 determines that the second tier of plants should be repositioned in order to get more light.

Step 804 sets forth an example of a change to ecology factors of the cultivation system 62 based on sensor data and ecology data associated with the cultivation system 62. In embodiments, the cognitive server 60 determines desired changes to ecology factors (e.g., water, nutrients, microbes, pH, other plants, insects, animals, light, temperature, etc.). In one example, sensor data from the sensors 64 of the cultivation system 62 indicate that plants on a second tier of the multi-tiered hydroponic system are not receiving enough nutrients according to parameters established by the ecology framework for the cultivation system 62. In this example, the cognitive server 60 determines that additional nutrients should be fed to the second tier of plants.

At step 805, the cognitive server 60 automatically implements changes to the cultivation system 62 based on the adjustments determined at step 802. In implementations, the cognitive server 60 sends instructions to a controller (e.g., computer device 63) of a multi-tiered hydroponic device of the cultivation system 62, which instructs the hydroponic device to effect changes to the cultivation system 62. For example, the cognitive server 60 may send instructions to the computing device 63 to cause the multi-tiered hydroponic device to either move the position of a plant container or change ecology factors of the system (e.g., add water, change lighting, add nutrients, change pH, move another plant closer or farther from the plant of interest, etc.).

At step 806, the cognitive server 60 outputs a notification regarding adjustments determined at step 802. In embodiments, the cognitive server 60 sends notification regarding changes needed to improve and/or maintain the health of the cultivation system 62 when the changes are ones that are not enabled for automation by the cultivation system 62. For example, a notification may be sent to a manager of the cognitive server 60 (e.g., via the user computer device 72) suggesting that the manager introduce more pollinators (e.g., honey bees) into the cultivation system 62. In another example, the cognitive server 60 may send a notification to a manager of the cultivation system 62 to introduce a particular type of beneficial microbe into the cultivation system 62.

At step 807, the cognitive server 60 updates the ecology framework based on feedback data received. Thus, embodiments of the invention provide a feedback system for self-learning and improvement of the ecology framework over time. In embodiments, the cognitive server 60 receives feedback data in the form of real-time sensor data from sensors (e.g., sensors 64). In embodiments, the cognitive server 60 receives feedback data in the form of user data, such as through questionnaires or other data gathering tools. In one example, a manager of the cultivation system 62 sends data regarding the health of the cultivation system 62 to the cognitive server 60 through an interface on the user computer device 72. Feedback data received at the cognitive server 60 may include any data related to the health of the overall cultivation system 62 (e.g., all living organisms within the system, including plants, animals, insects, microbes, etc.), as well as the health of particular organisms in the cultivation system 62 (e.g., main plant of interest). It should be understood that step 807 can be performed continuously or periodically, and may be performed at any time during the process depicted in FIG. 7.

Based on the above, embodiments of the invention enable: the use of analytics to change the land to optimize crop growth; the use of the z dimension to grow hydroponic crops in any number of vertical levels; and beneficial interactions of hydroponic crop levels and land-based levels (e.g., hydroponic levels can be physically moved to allow more sunlight or provide shade or act as a type of polarized lens, etc.).

Figure 8:
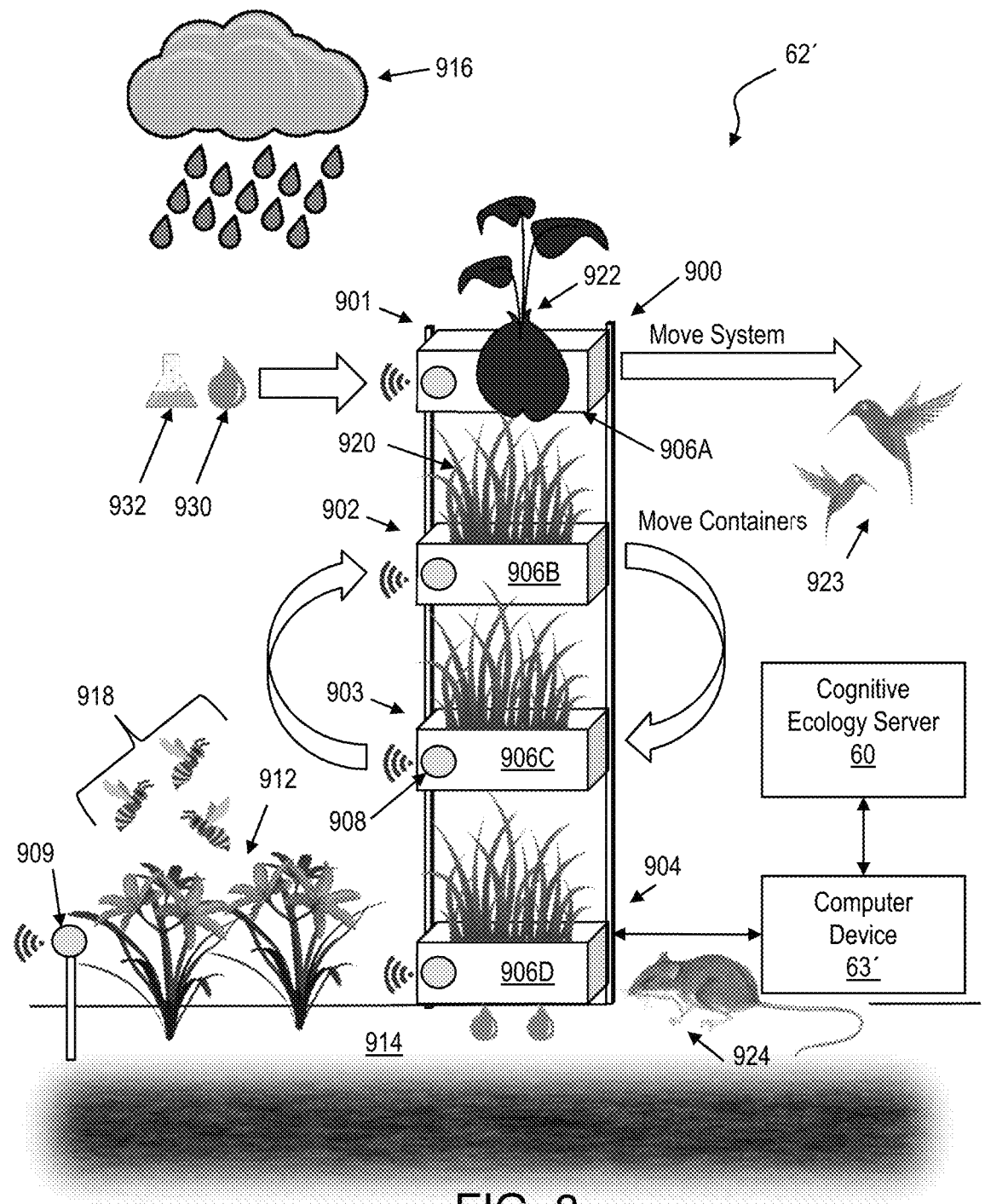
FIG. 8 illustrates an exemplary use scenario in accordance with embodiments of the invention.

FIG. 8 illustrates an exemplary use scenario, wherein an exemplary cultivation system 62' is shown. The cultivation system 62' may be utilized in the environment of FIG. 2 to perform steps described with respect to FIGS. 3 and 7.

In the example of FIG. 8, the cultivation system 62' includes at least one multi-tiered hydroponic growing system 900 (hereafter growing system 900) in communication with at least one computer device 63' configured to control aspects of the growing system 900. In this example, the growing system 900 includes multiple tiers (901-904) of growing containers 906A-906D, which are vertically repositionable. In this example, the entire growing system 900 is also shown horizontally moveable within the cultivation system 62'. The growing system 900 includes a plurality of sensors 908 and 909 configured to obtain data related to the ecology of the growing system 900. The sensors 908 and 909 are shown as being in wireless communication with the computer device 63', but may comprise wired sensors in addition or in the alternative. The cultivation system 62' also includes a terrestrial component represented by the flowers 912 growing directly in native soil 914 at the location of the cultivation system 62'.

The cultivation system 62' is an open air system (i.e., not contained), which is open to the natural elements including local precipitation represented at 916. The cultivation system 62' may include a variety of animal and insect life. In the example shown, the cultivation system 62' includes insects (e.g., bees 918) determined by the cognitive server 60 to be beneficial to plants of interest 920 (hereafter primary plant 920). Other plants found to be beneficial to cultivation of the plants of interest 920 are included in the cultivation system 62', including secondary plants 922 and the flowers 912. Additionally, animals (e.g., environmental factors) known by the cognitive server 60 to be present in the environment of the cultivation system 62' are taken into account in the design and management of the cultivation system 62'. For example, birds and small mammals depicted at 923 and 924 may be incorporated into the ecology framework of the cultivation system 62' by the cognitive server 60. The cognitive server 60 is shown in communication with the computer device 63'.

In one exemplary use scenario, the cognitive server 60 determines ecology factors related to the primary plant 920. The ecology factors include one or more of the factors determined in steps 300-309 of FIG. 3. In accordance with step 310 of FIG. 3, the cognitive server 60 determines beneficial interdependencies of the ecology factors using an artificial neural network of the cognitive server 60. In accordance with steps 311 and 312 of FIG. 3, the cognitive server 60 predicts the impact of ecological factors on the primary plant 920, and generates an ecology framework for the primary plant 920. The cultivation system 62' shown, is based on the ecology framework generated by the cultivation system 62'. In particular, the cognitive server 60 determined in the scenario of FIG. 8 that flower 912 attracted pollinators (bees 916) beneficial to pollination of the primary plant 920. Moreover, the cognitive server 60 determined, through deep learning, that shade provided by the secondary plant 922, as well as microbes that thrive in the vicinity of the secondary plant 922, are beneficial to the primary plant 920.

Accordingly, the cultivation system 62' makes use of identified beneficial interdependencies to establish an environment conducive to the growth of the primary plant 920, in accordance with step 800 of FIG. 7. In accordance with step 801 of FIG. 7, the cognitive server 60 receives environment data for the cultivation system 62', wherein the environment data is in the form of real-time sensor data from sensors 908 and 909 (via the computer device 63'), as well as user input received from the computer device 63'.

In the scenario of FIG. 8, the cognitive server 60 determines that the primary plant 920 in growing container 906B requires more sunlight based on sensor data received, and also determines that additional water 930 and nutrients 932 are needed. The cognitive server 60 also determines based on observed data entered into the computer device 63' that additional pollinators are needed. In accordance with step 805, the cognitive server 60 sends instructions to the computer device 63', which causes the computer device 63' to automatically rotate the growing container 906A down to the fourth tier 904, such that the secondary plant 922 no longer provides shade to the primary plant 920 located in lower tiers. Moreover, the cognitive server 60 sends instructions to the computer device 63' to cause the computer device 63' to automatically change the water 930 and nutrients 932 supplied to the growing system 900. The cognitive server 60 also recognizes that the pollinators are low for the cultivation system 62', based on the ecology framework for the cultivation system 62', and sends a notification to the manager of the cultivation system 62' (via the computer device 63') indicating that additional pollinators (e.g., bees 916) should be introduced into the cultivation system 62' in accordance with step 806 of FIG. 7. The cognitive server 60 also updates the cognitive framework based on the input from the cultivation system 62' (e.g., real-time sensor data and user input), in accordance with step 807 of FIG. 7.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for generating an ecology framework for plant cultivation based on beneficial interdependencies derived from an artificial neural network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In one exemplary embodiments, a computer-implemented method for tiered land and hydroponic natural forming optimization and analytics comprises: identifying one or more crops in one or more containers; determining the required and optimum ecological requirements (water, nutrients, additives, light, microbes, pollination, PH levels, etc.) for the one or more crops in each of the one or more containers; identifying the potential available requirements for each of the one or more crops and the one or more containers by receiving signals from sensors located in the one or more containers; and adjusting a requirement for at least one container based upon the identified potential requirement. In aspects, the containers are hydroponic containers. In embodiments, the containers are moveable by automatic devices, which can adjust the requirements based upon the movement of the containers. In aspects, the adjusting the requirements for a container is automated based upon a preset level of desired requirements for each container.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
determining, by a computing device, ecology factors associated with a plant of interest, including identifying other plants, animals, insects and microbes having an ecological impact on the plant of interest;
identifying, by the computing device, beneficial interdependencies of the ecology factors associated with the plant of interest based on an output of an artificial neural network system, wherein ecology data regarding the ecology factors is the input to the artificial neural network system;
predicting, by the computing device, an impact of ecology factors on the plant of interest for a first configuration of the ecology factors;
predicting, by the computing device, an impact of ecology factors on the plant of interest for a second configuration of ecology factors different from the first configuration;
generating, by the computing device, an ecology framework for the plant of interest within a cultivation system including other plants, animals, insects and microbes based on the beneficial interdependencies of the ecology factors and the predicted impacts of the first and second configurations of ecology factors, wherein the ecology framework reflects ecological conditions desired to promote healthy growth of the plant of interest; and
after implementing the ecology framework within the cultivation system, receiving environment data from the cultivation system, wherein the environment data provides the computing device with information regarding a state of the cultivation system.

2. The computer-implemented method of claim 1, further comprising identifying, by the computing device, the plant of interest for use in the cultivation system.

3. The computer-implemented method of claim 1, further comprising receiving environmental data regarding a location of the cultivation system and updating the ecology framework based on the environment data.

4. The computer-implemented method of claim 1, wherein the environment data includes real-time sensor data obtained from sensors at the cultivation system.

5. The computer-implemented method of claim 1, further comprising determining desired adjustments to the cultivation system based on the environment data.

6. The computer-implemented method of claim 5, further comprising, outputting a notification regarding the desired adjustments.

7. The computer-implemented method of claim 5, further comprising, automatically implementing changes to the cultivation system based on the desired adjustments.

8. The computer-implemented method of claim 5, wherein the adjustments comprise changes to a position of a plant container in a multi-tiered hydroponic device of the cultivation system.

9. A computer program product comprising a non-transitory computer readable storage medium having program instructions embodied therewith, the program instructions executable by a computing device to cause the computing device to:
   determine ecology factors associated with a plant of interest, including identifying other plants, animals, insects and microbes having an ecological impact on the plant of interest;
   identifying beneficial interdependencies of the ecology factors associated with the plant of interest based on an output of an artificial neural network system, including:
      inputting qualitative ecology data to an encoder to produce word encodings;
      inputting the word encodings into a long-short term memory (LSTM) neural network to produce a vector output;
      inputting quantifiable ecology data and the vector output into a convolutional neural network (CNN) to produce a main output; and
      analyzing the main output to determine the beneficial interdependencies of the ecology factors;
   predict an impact of ecology factors on the plant of interest for a first configuration of the ecology factors;
   predict an impact of ecology factors on the plant of interest for a second configuration of ecology factors different from the first configuration; and
   generate an ecology framework for the plant of interest within a cultivation system including other plants, animals, insects and microbes based on the beneficial interdependencies of the ecology factors and the predicted impacts of the first and second configurations of ecology factors, wherein the ecology framework reflects ecological conditions desired to promote healthy growth of the plant of interest.

10. The computer program product of claim 9, further comprising program instruction to cause the computing device to receive environment data from the cultivation system, wherein the environment data provides the computing device with information regarding a state of the cultivation system.

11. The computer program product of claim 10, further comprising program instruction to cause the computing device to update the ecology framework based on the environment data.

12. The computer program product of claim 10, wherein the environment data includes real-time sensor data obtained from sensors at the cultivation system after implementation of the ecology framework within the cultivation system.

13. The computer program product of claim 12, further comprising program instruction to cause the computing device to determine desired adjustments to the cultivation system based on the real-time sensor data.

14. A system comprising:
   a processor, a computer readable memory and a computer readable storage medium associated with a computing device;
   program instructions to determine ecology factors associated with a plant of interest including identifying secondary plants, animals, insects and microbes;
   program instructions to identify beneficial interdependencies of the ecology factors associated with the plant of interest based on an output of an artificial neural network system, wherein ecology data regarding the ecology factors is the input to the artificial neural network system and wherein the beneficial interdependencies include beneficial interdependencies between the plant of interest and at least one of the secondary plants within a cultivation system;
   program instructions to predict an impact of ecology factors on the plant of interest for a first configuration of the ecology factors;
   program instructions to predict an impact of ecology factors on the plant of interest for a second configuration of ecology factors different from the first configuration;
   program instructions to generate an ecology framework for the plant of interest within the cultivation system including the at least one secondary plant, based on the beneficial interdependencies of the ecology factors and the predicted impacts of the first and second configurations of ecology factors, wherein the ecology framework reflects ecological conditions desired to promote healthy growth of the plant of interest within the cultivation system; and
   program instructions to receive environment data from the cultivation system after implementing the ecology framework within the cultivation system, wherein the environment data provides the computing device with information regarding a state of the cultivation system,
   wherein the program instructions are stored on the computer readable storage medium for execution by the processor via the computer readable memory.

15. The system of claim 14, wherein the cultivation system includes a multi-tiered hydroponic device, and within the ecology framework the plant of interest is an above-ground plant growing in the multi-tiered hydroponic device of the cultivation system and the at least one secondary plant is an in-ground plant growing terrestrially in the cultivation system.

16. The system of claim 14, wherein the cultivation system includes a multi-tiered hydroponic device, and within the ecology framework the at least one secondary plant is an above-ground plant growing in the multi-tiered hydroponic device of the cultivation system and the plant of interest is an in-ground plant growing terrestrially in the cultivation system.

17. The system of claim 14, wherein the ecology framework includes one or more microbes, insects, and animals.

18. The system of claim 14,
   wherein the ecology framework is further based on the environmental data.

19. The computer-implemented method of claim 1, further comprising identifying a native geographic origin of the plant of interest, wherein the ecology factors are based on the geographic origin of the plant of interest.

* * * * *